United States Patent
Cho et al.

(10) Patent No.: US 10,041,861 B2
(45) Date of Patent: Aug. 7, 2018

(54) APPARATUS AND METHOD FOR TESTING DRILLING EFFICIENCY OF DRILL BIT

(71) Applicant: KOREA INSTITUTE OF INDUSTRIAL TECHNOLOGY, Cheonan-si, Chungcheongnam-do (KR)

(72) Inventors: Jung-Woo Cho, Seoul (KR); Dae-Young Shin, Incheon (KR); Jae-Wook Lee, Daegu (KR); Joo-Young Oh, Daejeon (KR); Jin-Young Park, Daegu (KR); Ki-Beom Kwon, Seoul (KR); Chang-Heon Song, Anyang-si (KR)

(73) Assignee: KOREA INSTITUTE OF INDUSTRIAL TECHNOLOGY, Cheonan-si, Chungcheongnam-do (KR)

( * ) Notice: Subject to any disclaimer, the term of this patent is extended or adjusted under 35 U.S.C. 154(b) by 97 days.

(21) Appl. No.: 15/108,518

(22) PCT Filed: May 1, 2014

(86) PCT No.: PCT/KR2014/003905
§ 371 (c)(1),
(2) Date: Jun. 27, 2016

(87) PCT Pub. No.: WO2015/102165
PCT Pub. Date: Jul. 9, 2015

(65) Prior Publication Data
US 2016/0320267 A1    Nov. 3, 2016

(30) Foreign Application Priority Data

Jan. 3, 2014 (KR) .................. 10-2014-0000844

(51) Int. Cl.
*E21B 10/36* (2006.01)
*E21B 10/42* (2006.01)
(Continued)

(52) U.S. Cl.
CPC .......... *G01M 99/008* (2013.01); *E21B 10/36* (2013.01); *E21B 10/42* (2013.01); *E21B 10/43* (2013.01); *G01F 22/00* (2013.01); *G01L 5/0052* (2013.01)

(58) Field of Classification Search
CPC .......... E21B 10/36; E21B 10/42; E21B 10/43
(Continued)

(56) References Cited

U.S. PATENT DOCUMENTS 4,987,766 A * 1/1991 Brar ................. G01N 3/303
73/12.13
5,115,881 A * 5/1992 Meynier ............... G01V 1/147
175/1
(Continued)

FOREIGN PATENT DOCUMENTS

KR    10-2006-0067031 A    6/2006
KR    10-0918664 B1        9/2009
(Continued)

OTHER PUBLICATIONS

English machine translation for document KR1020130067782.*
(Continued)

*Primary Examiner* — Daniel S Larkin
*Assistant Examiner* — Anthony W Megna Fuentes
(74) *Attorney, Agent, or Firm* — McDermott Will & Emery LLP

(57) ABSTRACT

An apparatus and a method for testing drilling efficiency of a drill bit, according to the present invention, calculate an amount of fractured rock according to a button arrangement, thereby obtaining an optimum button arrangement.

3 Claims, 11 Drawing Sheets

(51) Int. Cl.
*E21B 10/43* (2006.01)
*G01F 22/00* (2006.01)
*G01L 5/00* (2006.01)
*G01M 99/00* (2011.01)
*G01N 3/303* (2006.01)

(58) Field of Classification Search
USPC .......................................... 73/78, 81–83, 85
See application file for complete search history.

(56) References Cited

U.S. PATENT DOCUMENTS 5,890,551 A * 4/1999 Liljebrand .............. E21B 10/56
175/414
5,984,027 A * 11/1999 Kato .................... B25D 11/125
173/200

FOREIGN PATENT DOCUMENTS

| KR | 10-2011-0119186 A | 11/2011 |
| KR | 10-2012-0094714 A | 8/2012 |
| KR | 10-2013-0067782 A | 6/2013 |

OTHER PUBLICATIONS

Kwon, K. et al., "Rock Fragmentation Assessment of a Drill Bit by Hopkinson Bar Percussion Test", Tunnel & Underground Space, 2013, vol. 23, No. 1, pp. 42-53.
Kwon, K. et al., "Drilling efficiency investigation of a drill bit by piston-drop test", KSFC Conference, 2013, pp. 15-20, with English Abstract.
Kwon, K. et al., "Investigation of Drilling Efficiency using Percussion Test of Drill Bit", 2013, International Symposium on Green Manufacturing and Application.
Cho, J. et al., "Drilling efficiency investigation of a drill bit by multiple percussion tests", 2013, KTA 2013 Symposium, with English Abstract.
International Search Report issued in International Application No. PCT/KR2014/003905, dated Oct. 1, 2014, with English Translation.

* cited by examiner

[Fig. 1]
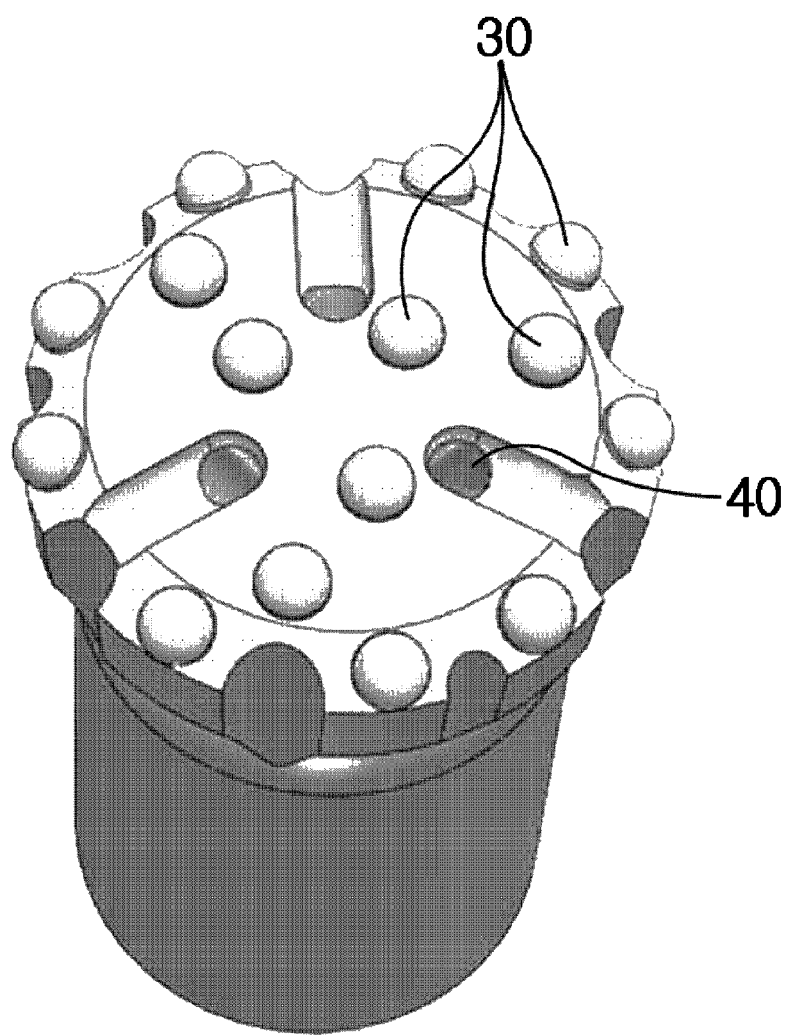

[Fig. 2a]
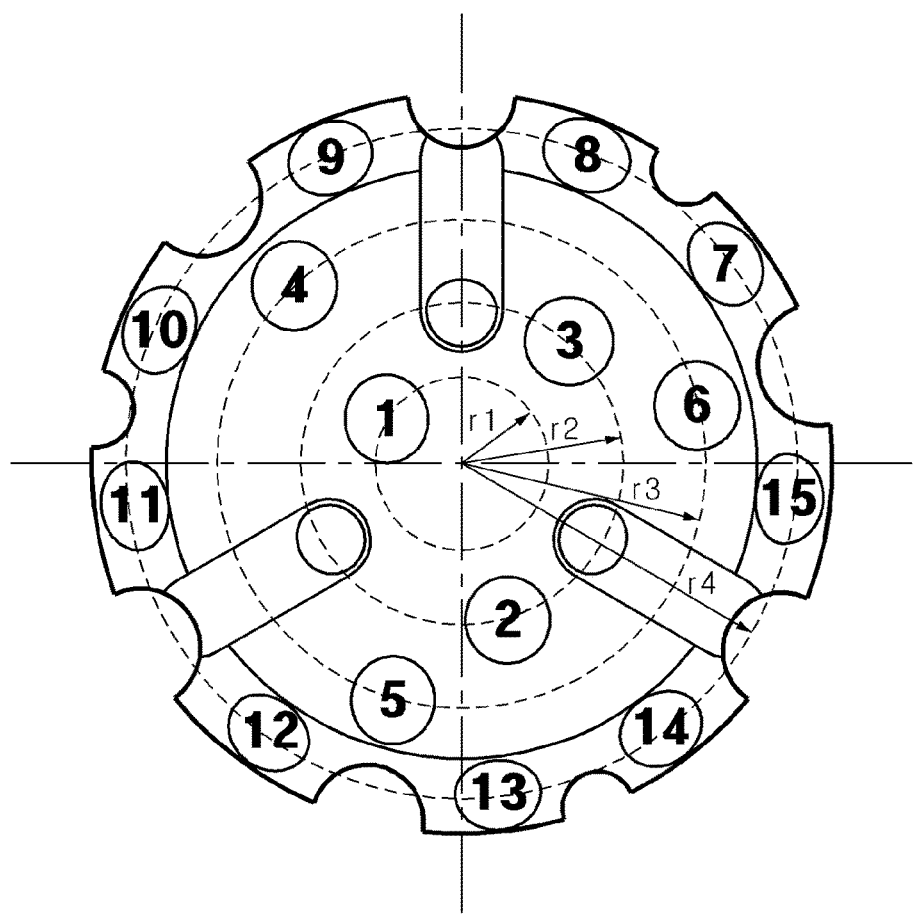

[Fig. 2b]
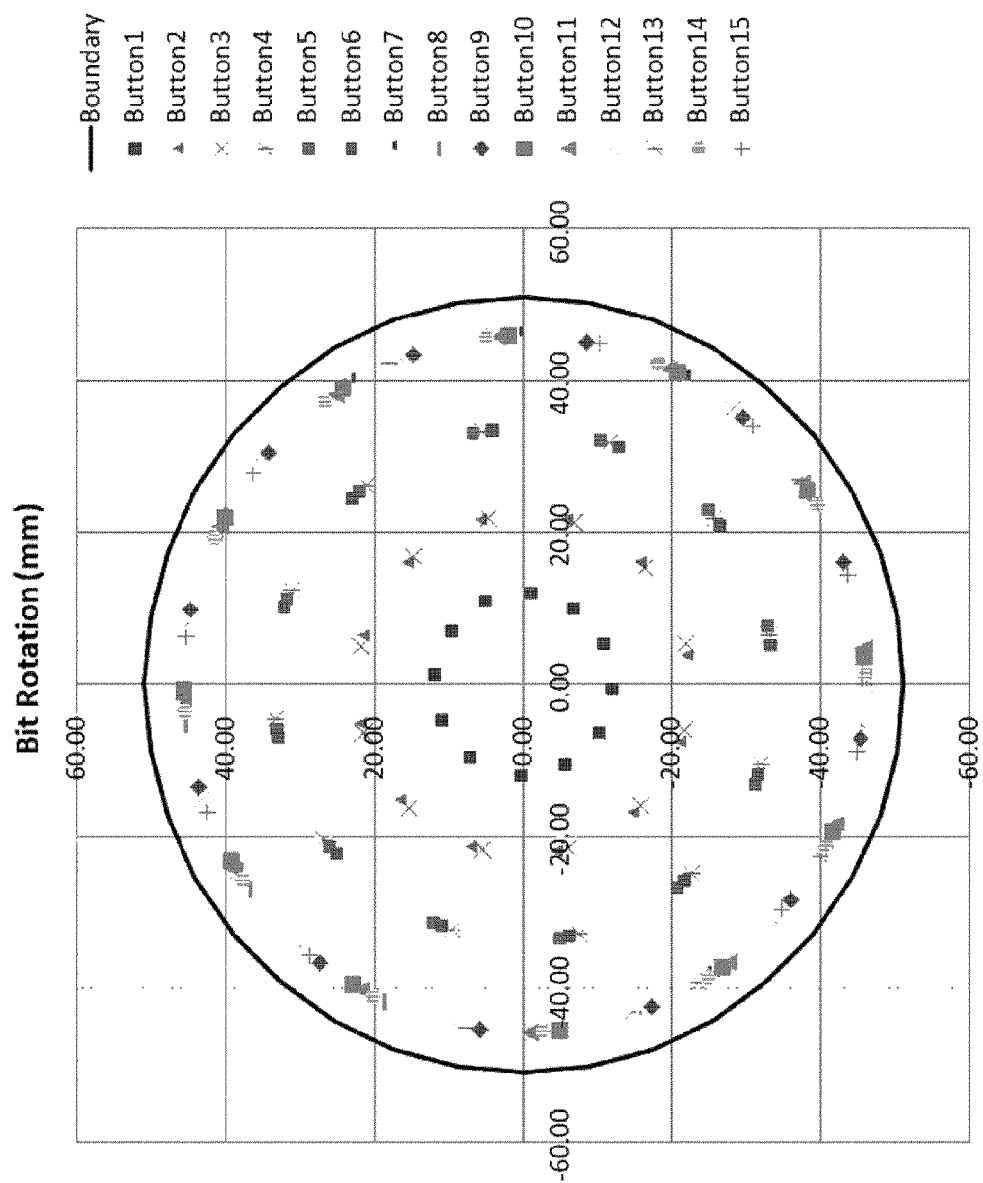

【Fig. 3a】
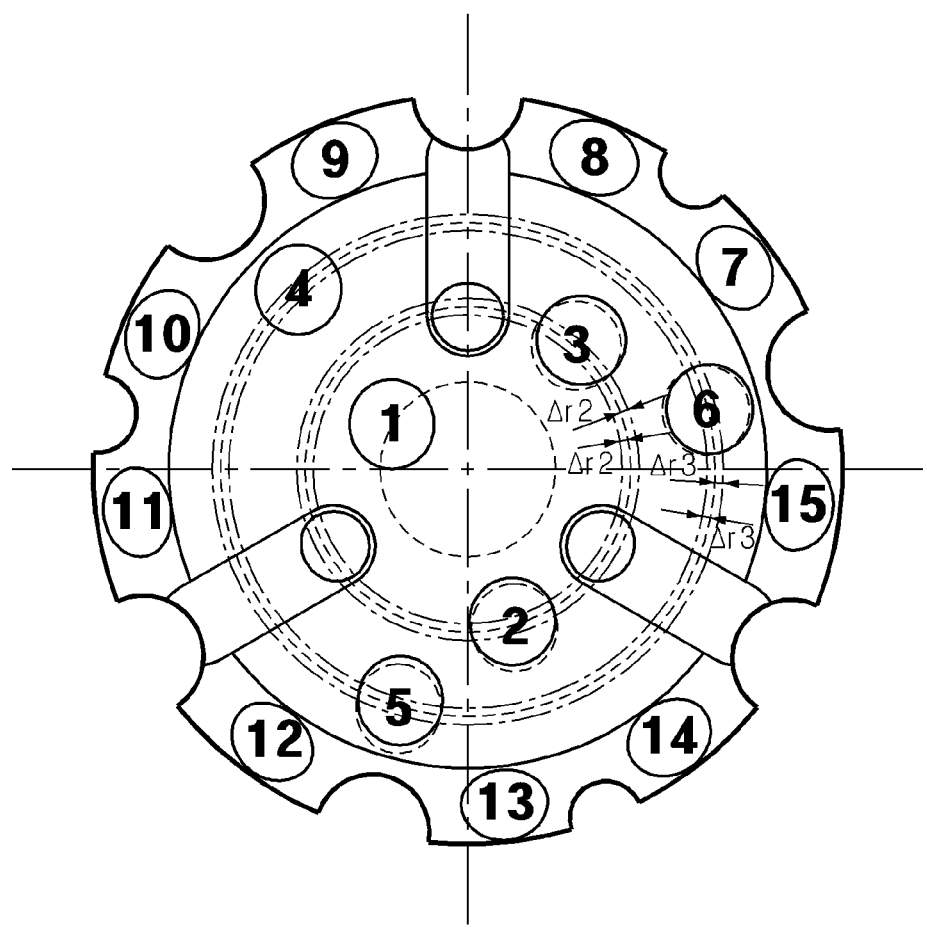

[Fig. 3b]
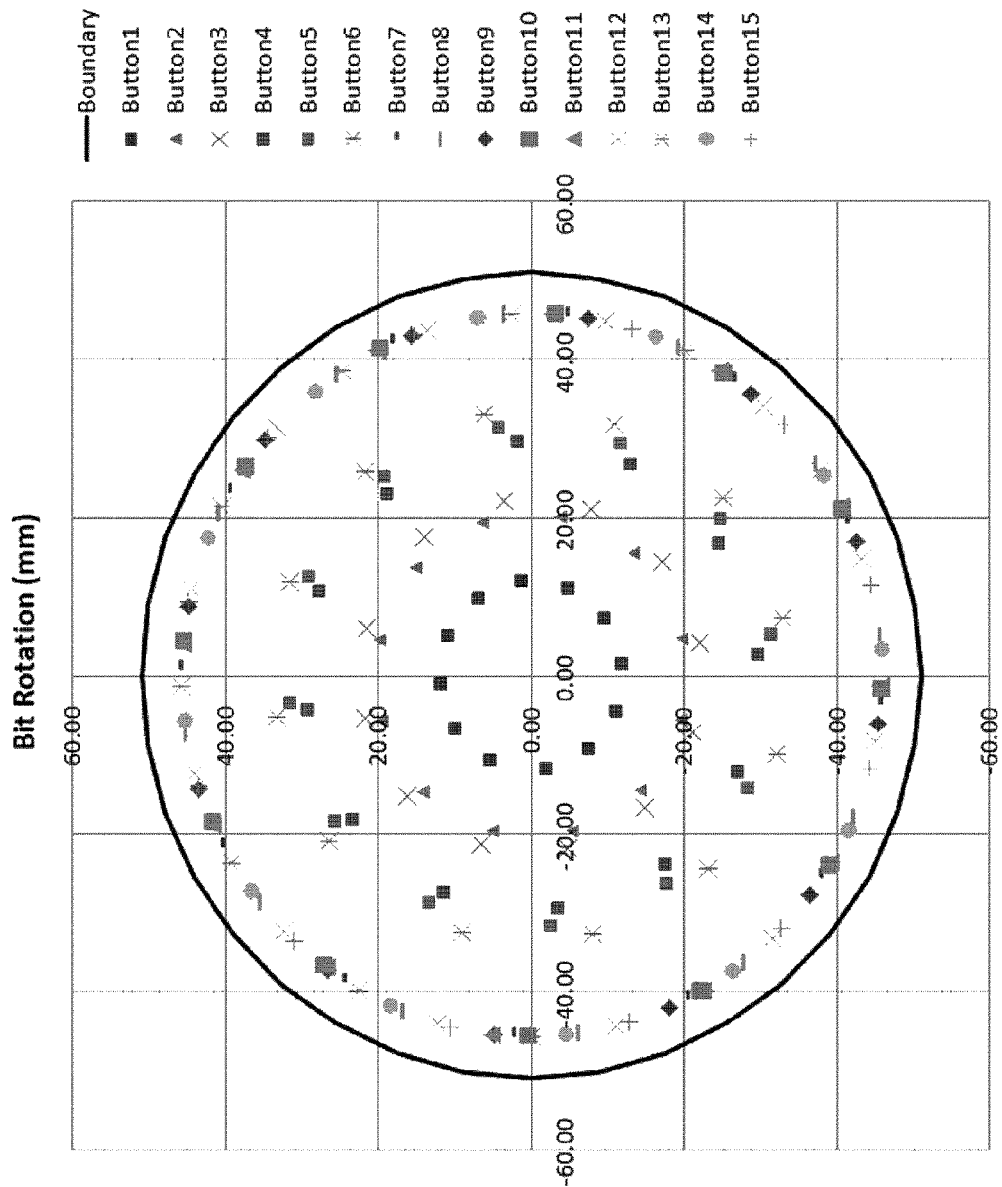

[Fig. 4]
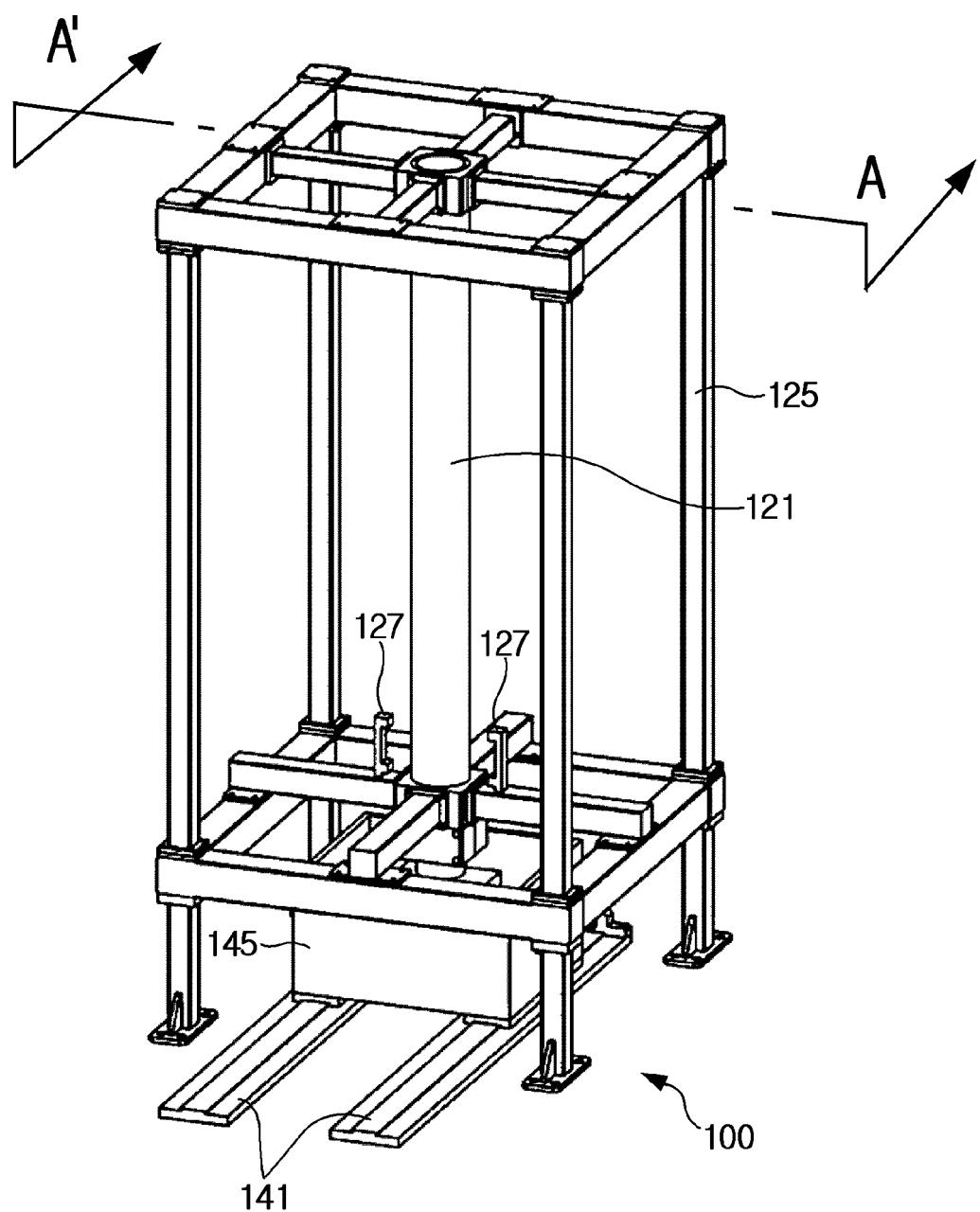

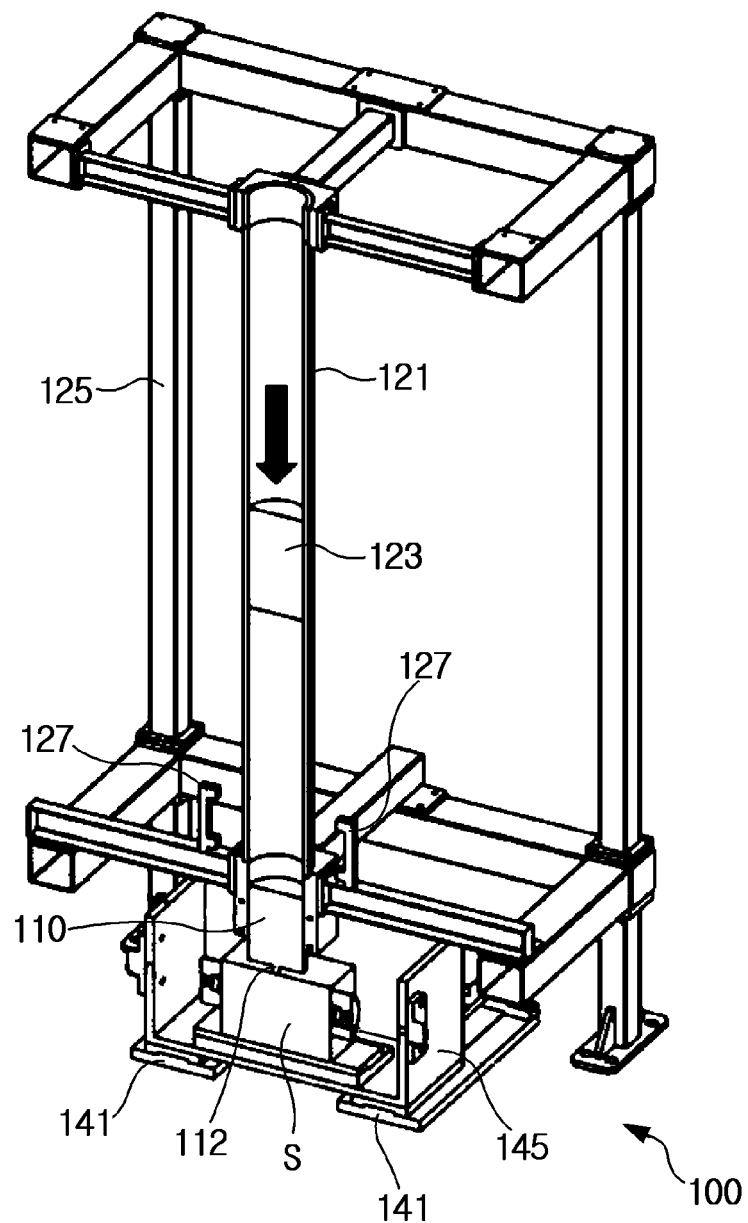
[Fig. 5]

[Fig. 6]
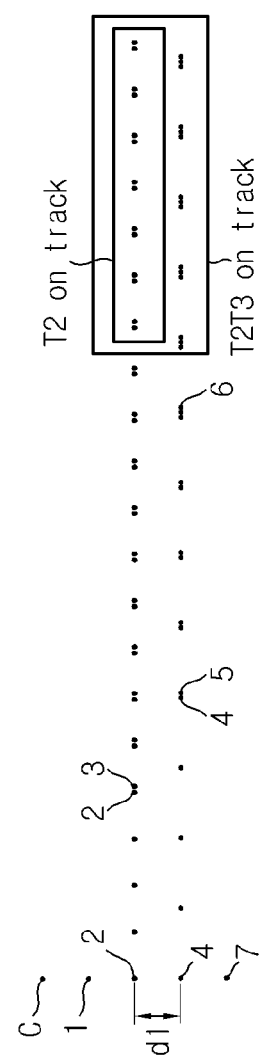

[Fig. 7]
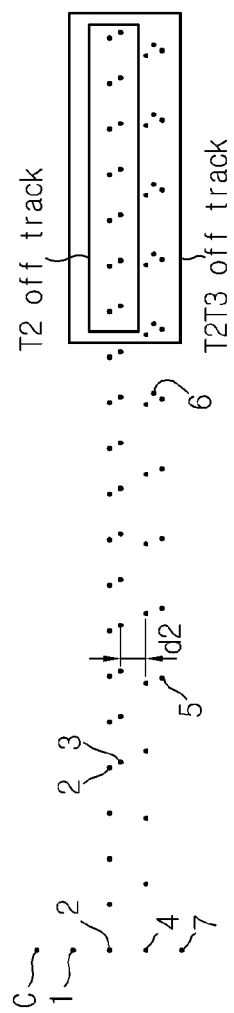

[Fig. 8]
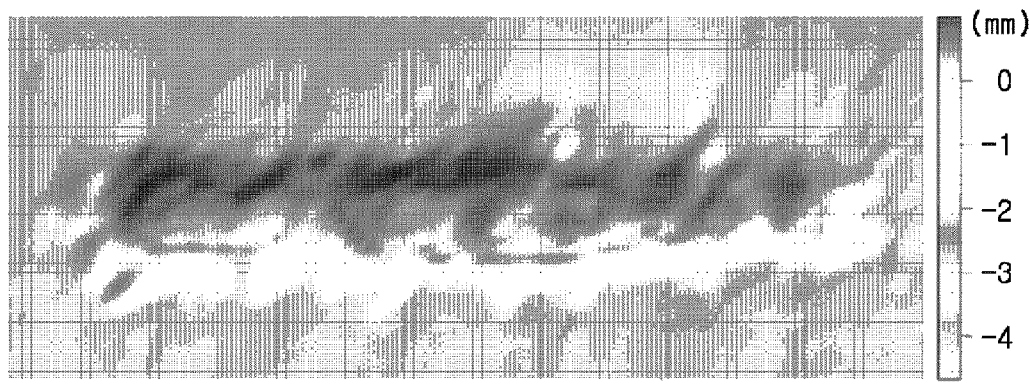
[Fig. 9]
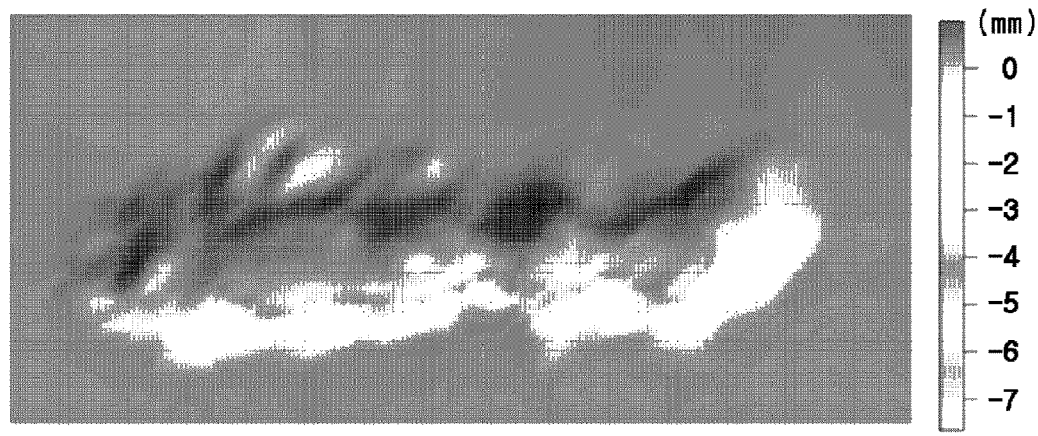

[Fig. 10]
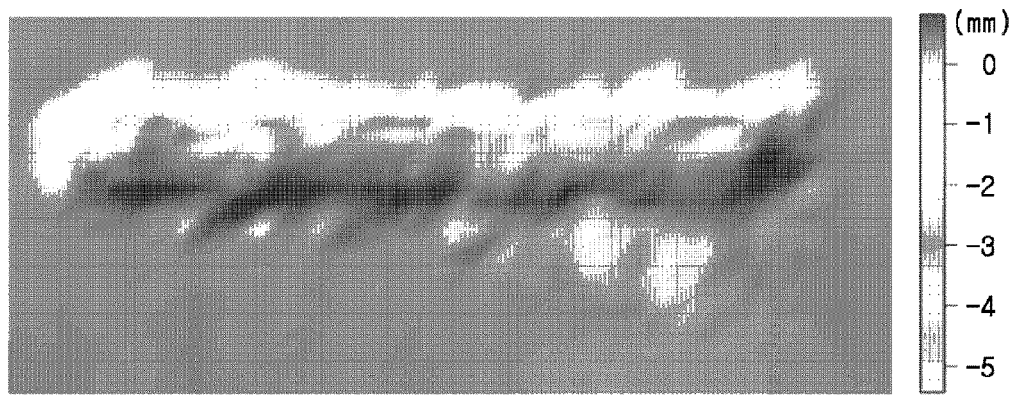
[Fig. 11]

APPARATUS AND METHOD FOR TESTING DRILLING EFFICIENCY OF DRILL BIT

RELATED APPLICATIONS

This application is the U.S. National Phase under 35 U.S.C. § 371 of International Application No. PCT/KR2014/003905, filed on May 1, 2014, which in turn claims the benefit of Korean Application No. 10-2014-0000844, filed on Jan. 3, 2014, the disclosures of which Applications are incorporated by reference herein.

TECHNICAL FIELD

The present disclosure relates to an apparatus for testing drilling efficiency of a drill bit, and more particularly, to an apparatus for testing drilling efficiency of a drill bit, in which an optimum button arrangement is obtained by calculating an amount of drilled rock according to a button arrangement. Further, the present disclosure relates to a testing method using the testing apparatus.

BACKGROUND ART

Generally, a drill bit is a key component of a drilling machine used to drill a rock by directly transmitting impact energy to the rock by percussion, rotation and feeding actions. FIG. 1 shows a drill bit having a diameter of 102 mm, and the drill bit has buttons 30 and flushing channels 40 arranged on a head.

When the buttons 30 of the drill bit are located at a new percussion position by the rotation, the percussion is performed. Also, the rock fractured by the percussion is fragmented again by consecutive percussion and rotation, and is discharged out of a drill hole by air supply.

FIG. 2(a) shows that the buttons 30 of FIG. 1 form four concentric circles (tracks). That is, button no. 1 hits the rock while drawing a circle (track) of radius r1 at the innermost, button nos. 2 and 3 hit the rock while drawing a second circle (track) of radius r2, and buttons nos. 4~6 hit the rock while drawing a third circle (track) of radius r3. Finally, gauge buttons having nos. 7~15 hit an outermost position while drawing a fourth circle (track) of radius r4.

In the process of drilling the rock, percussion spots of the buttons 30 change depending on operation conditions of a drifter. Although it is ideal for efficient rock drilling to operate a drifter to have overall uniform percussion spots, percussion spots of buttons overlap under a particular operation condition as in FIG. 2(b), causing drilling efficiency reduction. For reference, the percussion spots of FIG. 2(b) refer to spots for hitting the rock when the drill bit having the button arrangement of FIG. 2(a) operates at 180 R.P.M. (revolution per minute), 2200 B.P.M. (blow per minute), and it shows some overlap of percussion spots.

Because it is in reality impossible to operate the drifter to always have uniform percussion spots in construction site, it is important to arrange the buttons 30 to prevent an overlap of percussion spots.

DISCLOSURE

Technical Problem

The Applicant developed a computer program to simulate percussion spots according to R.P.M and B.P.M of a drill bit so that buttons 30 of the drill bit are arranged to prevent percussion spots from overlapping.

The computer program simulates percussion spots with varying R.P.Ms and B.P.Ms without actually manufacturing and testing a drill bit, and accordingly, can increase drilling efficiency by re-arranging buttons of a conventional drill bit.

FIG. 3(a) shows that the buttons of FIG. 2(a) are re-arranged through the computer program simulation. Specifically, in FIG. 3(a), button no. 2 on track no. 2 is rearranged as much as Δr2 towards the center from r2, button no. 3 is rearranged as much as Δr2 outwards from r2, button no. 5 on track no. 3 is rearranged as much as Δr3 towards the center from r3 and, and button no. 6 on track no. 3 is rearranged as much as Δr3 outwards from r3. In this instance, preferably Δr2 and Δr3 are approximately 2 mm-3 mm.

FIG. 3(b) shows percussion spots formed by the buttons of FIG. 3(a). For reference, FIG. 3b shows percussion spots for hitting a rock by the drill bit having the button arrangement of FIG. 3a and operated in the condition of 180 R.P.M. (revolution per minute) and 2200 B.P.M. (blow per minute). When comparing FIG. 3b and FIG. 2b, it can be seen that the percussion spots of FIG. 3b has a much less overlap of percussion spots than the percussion spots of FIG. 2b, and a less overlap of percussion spots represents that rock drilling efficiency is high as much.

The Applicant devised the present disclosure together with the computer program to test drilling efficiency of the re-arranged buttons for a real rock specimen. That is, the present disclosure is directed to providing an apparatus and method for testing drilling efficiency of a drill bit in which an amount of drilled rock according to a button arrangement is obtained on a real rock specimen to determine whether the button arrangement is proper.

In addition, the present disclosure is directed to providing an apparatus and method for testing drilling efficiency of a newly manufactured drill bit as well as the drill bit having the buttons rearranged by the computer program. And, the present disclosure is directed to providing optimum button arrangement and impact energy (or impact velocity) by calculating an amount of drilled rock by varying the positions of buttons and impact energy (or impact velocity).

Further, the present disclosure is directed to providing an apparatus and method for testing drilling efficiency of a drill bit, in which structure is simple, cost is low, and testing can be completed in a short time.

Technical Solution

To achieve the above-described object, a testing apparatus according to the present disclosure includes a percussion member having a button 112, an impact energy generation unit configured to transmit energy for hitting a rock specimen s to the percussion member, and a fixing and moving means configured to fix the rock specimen s to prevent movement by the hitting, and after the hitting, to move the rock specimen by a predetermined distance.

The impact energy generation unit may include a guide pipe 121 which is installed vertically and is hollow inside, a drop piston 123 which is installed to free-fall within the guide pipe 121, and a frame 125 configured to support the guide pipe 121.

Also, the percussion member may include a percussion piston 110 and the button 112 installed at a lower end of the percussion piston 110. The drop piston 123 falls within the guide pipe 121 to hit the percussion piston 110, and accordingly, the button 112 hit the rock specimen s.

The fixing and moving means may include a box 145 configured to receive the rock specimen s therein, the box fixing the rock specimen s to prevent movement, the box having an upper surface which is open for allowing the button 112 to hit, and a fixing part configured to fix the box 145 to a flat plate to prevent the box 145 from moving at the time of the hitting, and after the hitting, to release the fixing and move the box 145 along a straight line.

The present disclosure changes circular percussion spots of the drill bit buttons into linear percussion spots, and the button 112 hits the linear percussion spots, and after the hitting by the button 112, the fixing and moving means moves rock specimen s along a straight line.

A method for testing drilling efficiency according to another aspect of the present disclosure includes the steps of (a) preparing an apparatus for testing drilling efficiency, the apparatus including a drop piston 123 which is installed to free-fall within a guide pipe 121, and a percussion piston 110 having a button 112 at a lower end, (b) allowing the button 112 to hit a rock specimen s by allowing the drop piston 123 to fall to hit the percussion piston 110, (c) moving the rock specimen s to a predetermined distance after the step (b), and hitting the rock specimen s, and (d) calculating specific energy by measuring a volume of rock fractured by the hitting.

The testing method may include, before the step (a), changing circular percussion spots of the drill bit buttons to linear percussion spots. Also, the step (a) and the step (b) include hitting the rock specimen s to correspond to the linear percussion spots.

An optimum impact velocity or impact energy and distance between the buttons may be calculated by calculating the specific energy with varying the impact velocity or impact energy of the percussion member, and the predetermined distance.

DESCRIPTION OF DRAWINGS

FIG. 1 is a perspective view showing a conventional drill bit.

FIG. 2a is a diagram showing buttons and flushing channels arranged on the drill bit of FIG. 1.

FIG. 2b is a diagram showing percussion spots by the buttons of FIG. 2a.

FIG. 3a is a diagram showing re-arrangement of the buttons of FIG. 2a.

FIG. 3b is a diagram showing percussion spots by the buttons of FIG. 3a.

FIG. 4 is a perspective view showing an apparatus for testing drilling efficiency of a drill bit according to a preferred embodiment of the present disclosure.

FIG. 5 is a cross-sectional view taken along the line A-A' of FIG. 4.

FIG. 6 is a diagram showing a linearized percussion spot from a circular percussion spot of FIG. 2b.

FIG. 7 is a diagram showing a linearized percussion spot from a circular percussion spot of FIG. 3b.

FIG. 8 is a diagram showing rock fractured by buttons on track no. 2 of FIG. 2a.

FIG. 9 is a diagram showing rock fractured by interaction of track no. 2 buttons and track no. 3 buttons of FIG. 2a.

FIG. 10 is a diagram showing rock fractured by buttons on track no. 2 of FIG. 3a.

FIG. 11 is a diagram showing rock fractured by interaction of track no. 2 buttons and track no. 3 buttons of FIG. 3a.

[Detailed Description of Main Elements]

| | |
|---|---|
| 30: Button | 40: Flushing channel |
| 100: Apparatus for testing drilling efficiency | 110: Percussion piston |
| 112: Button | 121: Guide pipe |
| 123: Drop piston | 125: Frame |
| 127: Speedometer | 141: Guide rail |
| 145: Box | s: Rock specimen |

BEST MODE

Hereinafter, the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical spirit of the present disclosure on the basis of the principle that the inventor is allowed to define terms appropriately for the best explanation. Therefore, the embodiments described in the specification and configurations illustrated in the drawings are just embodiments or examples and do not represent all the technical spirit of the present disclosure, so it should be understood that a variety of other equivalents and modifications could be made to substitute for them at the time the application is filed.

FIG. 4 is a perspective view showing a testing apparatus according to a preferred embodiment of the present disclosure, and FIG. 5 is a cross-sectional view taken along the line A-A' of FIG. 4.

As shown in the drawings, the testing apparatus 100 includes a percussion member to hit a rock specimen s, an impact energy generation unit to generate energy for hitting the rock specimen s, and a fixing and moving means to fix and move the rock specimen s.

The percussion member includes a percussion piston 110 and buttons 112.

The percussion piston 110 is installed moveably vertically at the lower end of a guide pipe 121, and the buttons 112 are installed at the lower end of the percussion piston 110. The buttons 112 are buttons installed in the drill bit, and may be made of tungsten carbide.

The percussive force applied to the percussion piston 110 by the fall of a drop piston 123 is transmitted to the rock specimen s through the buttons 112.

The impact energy generation unit may include the guide pipe 121 installed vertically, a frame 125 to support the guide pipe 121, the drop piston 123 installed within the guide pipe 121, and a speedometer 127 to measure the fall speed of the drop piston 123.

The guide pipe 121 is a hollow pipe and has an upper end through which the drop piston 123 is introduced, and the introduced drop piston 123 falls free and hits the percussion piston 110. The guide pipe 121 preferably has such a diameter to allow free-fall of the drop piston 123.

Also, a long hole (not shown) in the vertical direction may be formed at the lower end of the guide pipe 121 to measure the speed of the drop piston 123 by speedometer 127. The long hole is formed at the location corresponding to the speedometer 127, and the speedometer 127 can measure the falling speed of the drop piston 123 through the long hole. Also, the long hole acts as a passage through which air in the guide pipe 121 is discharged when the drop piston 123 falls.

The frame 125 supports the guide pipe 121 so that the guide pipe 121 maintains vertically. In this instance, the frame 125 makes the lower end of the guide pipe 121 or the buttons 112 be positioned above a box 145 so that the box 145 can move in a space below the lower end of the guide pipe 121.

The drop piston 123 transmits impact energy to the percussion piston 110 by hitting the percussion piston 110 after free falling within the guide pipe 121. The impact energy can be adjusted by changing the weight of the drop piston 123 or a falling start height of the drop piston 123.

The speedometer 127 measures the impact energy applied the percussion piston 110 by the drop piston 123 by measuring the falling speed of the drop piston 123. To this end, the speedometer 127 is preferably installed at the height where the drop piston 123 hits the percussion piston 110. Because the speedometer 127 is readily available and its configuration is widely known, its description is omitted herein.

The fixing and moving means fixes the rock specimen s to prevent the rock specimen s from moving during percussion, and after percussion, moves the rock specimen s to a predetermined distance.

The fixing and moving means may include a guide rail 141, the box 145 which can slides on the guide rail 141, and a fixing part to selectively fix the box 145.

Two guide rails 141 are installed parallel to each other on the ground. Two guide rails 141 are installed such that the guide rail 141 extends to the space below the lower end of the guide pipe 121.

The box 145 receives the rock specimen s therein, and can move along the guide rail 141. The box 145 is preferably formed to constrain all boundary surfaces other than a percussion surface to prevent shock waves generated by percussion from being reflected as tensile waves at the boundary surface of the end of the rock specimen s, and to this end, only an upper surface of the box 145 is open and the other surfaces are constrained.

The box 145 is preferably fixed to the guide rail 141 or a flat plate (not shown) which supports the guide rail 141 at the time of the percussion so that the box 145 cannot move by the percussion of the percussion piston 110, and to this end, a fastener part (not shown) which is secured to the guide rail 141 or the flat plate through the lower surface of the box 145, for example, a bolt (not shown), may be provided. At the time of the percussion, the bolt is secured to the guide rail 141 or the flat plate to prevent the box 145 from moving by the percussion, and when moving the box 145 after the percussion, the bolt coupling is released to allow the box 145 to move.

On the other hand, a breaker device (not shown) which fixes the box 145 to the guide rail 141 may be used, independently of the bolt coupling or together with the bolt coupling. Because the breaker device has the structure widely used for rail bikes, automobiles, and carters, its description is omitted herein.

In order to fix the rock specimen s in the box, a gripper or a jig may be used, or a rock specimen fixing means disclosed in FIG. 4 of Korean Patent No. 918664 may be used. The gripper, jig, and fixing means can move a rock specimen by a distance between percussion spots, and they are widely used to fix rock specimens.

The testing apparatus having the foregoing configuration has advantages; its structure is simple, its cost is low, and testing can be completed in a short time.

A process of testing effectiveness of button arrangement using the testing apparatus 100 is now described.

First, percussion spots by the buttons of the drill bit are changed into a linear arrangement. When the drill bit operates and hits a rock, percussion spots form a circular shape as shown in FIGS. 2b and 3b, and testing can be simplified by transforming the circular shape formed by the percussion spots into a linear shape. That is, the transformation is accomplished by changing the arrangement of percussion spots forming a circular shape to a linear shape, and this change can simplify the testing apparatus and facilitate the test.

FIGS. 6 and 7 show percussion spots arranged linearly, and assume that percussion spots of all tracks start on the same line, and an interval between percussion spots on each track (for example, a distance between percussion spots of button no. 2 on track no. 2, a distance between percussion spots of button no. 2 and button no. 3 on track no. 2) corresponds to an interval between percussion spots in a circular percussion spot arrangement (i.e., arrangement of FIG. 2b). Further, in FIG. 6, a distance between each track corresponds to r1, r2-r1, r3-r2, r4-r3 respectively. Also, reference symbol C indicates a center point of the drill bit. And, FIGS. 6 and 7 show only a start point of track no. 1 and track no. 4.

In FIGS. 6 and 7, in order to set the drifter in operation condition of a lowest drilling efficiency, we assume that the drifter is operated in the condition of R.P.M.=180, B.P.M.=2200 which causes percussion spots of buttons to overlap. For reference, reference numeral of FIG. 6 indicates button number of FIG. 2a, and for example, reference numeral 2 indicates button no. 2 of FIG. 2a and reference numeral 3 indicates button no. 3 of FIG. 2a. And, reference numeral of FIG. 7 indicates button number of FIG. 3a, and for example, reference numeral 2 indicates button no. 2 of FIG. 3a and reference numeral 3 indicates button no. 3 of FIG. 3a.

Referring to FIG. 6, it can be seen that a percussion spot 2 of button no. 2 and a percussion spot 3 of button no. 3 are located very close to each other on an approximately same straight line. Also, it can be seen that a distance d1 between track no. 2 and track no. 3 is relatively wide.

On the other hand, referring to FIG. 7, it can be seen that a percussion spot of button no. 2 and a percussion spot of button no. 3 are spaced apart at a predetermined distance. As described above, this is because button no. 2 is rearranged as much as Δr2 towards the center from r2, and button no. 3 is rearranged as much as Δr2 outwards from r2. Further, it can be seen that a distance d2 between track no. 2 and track no. 3 is much narrower than that of FIG. 6.

As explained above, the test can be performed by hitting the percussion spots arranged linearly. Specifically, the drop piston 123 having a mass of 30 kg was allowed to free-fall from the height of 400 mm, and Hwangdeung granite from Hwangdeungmyeon, Iksansi, Jeollabukdo, Republic of Korea was used for the rock specimen s. The rock specimen s is 200 mm×200 mm×200 mm in size, and the compressive strength is 183 MPa, which is classified into hard rock.

After the rock specimen s is fixed within the box 145 and the box 145 is moved so that the box 145 is positioned below the percussion piston 110, then the box 145 is fixed.

Subsequently, when the drop piston 123 is allowed to free-fall to hit the percussion piston 110, the buttons 112 hit the rock specimen s to fracture the rock specimen s.

Subsequently, after the box 145 and/or the rock specimen s in the box 145 is moved by a distance between percussion spots of FIGS. 6 and 7 and then fixed in position, the drop piston 123 is allowed to fall to hit the rock specimen s.

FIGS. 8 to 11 are photographic images obtained by capturing a fracture formed in the rock specimen s through this process.

FIG. 8 shows the fracture measured by a laser scanner which was formed by track no. 2 (button nos. 2 and 3) having the button arrangement of FIG. 2a (conventional button arrangement). Namely, the fracture shown in FIG. 8 was formed by hitting the rock specimen s to correspond to the percussion spots of FIG. 6. FIG. 9 shows a fracture measured by a laser scanner which was formed by interaction of track no. 2 button and track no. 3 button. Namely, the fracture shown in FIG. 9 was formed by hitting the rock specimen s to correspond to the percussion spots of FIG. 6.

FIG. 10 shows the fracture measured by a laser scanner which was formed by track no. 2 (button nos. 2 and 3) having the button arrangement of FIG. 3a (improved button arrangement). Namely, the fracture shown in FIG. 10 was formed by hitting the rock specimen s to correspond to the percussion spots of FIG. 7. FIG. 11 shows the fracture measured by a laser scanner which was formed by interaction of track no. 2 button and track no. 3 button which hit the rock specimen s to correspond to the percussion spots of FIG. 7.

Specific energy (SE) for comparing drilling efficiency is obtained by dividing impact energy by drilled rock volume, and may be calculated by the following equation:

$$SE(J/mm^3) = [\text{Impact energy}(E_p, J)] / [\text{Drilled volume}(V_p, mm^3)]$$

If the specific energy is relatively high, the energy required in drilling a unit volume increases. So, if the specific energy is lower, higher drilling efficiency is achieved. The specific energy and the improvement in drilling efficiency are summarized in Table 1.

Drifter is assumed to be operated under the condition of low drilling efficiency. In comparing drilling efficiency of a conventional button arrangement (button arrangement of FIG. 2a) and an improved button arrangement (button arrangement of FIG. 3a), it is investigated that the improved button arrangement has 47% improvement in drilling efficiency of track no. 2, and 45% improvement in composite drilling efficiency of track no. 2 and track no. 3.

TABLE 1

| Specimen classification | | Number of percussions | Drilled volume (mm³) | Impact energy (J) | Specific energy (SE, J/mm³) | The degree of drilling efficiency improvement |
|---|---|---|---|---|---|---|
| Conventional arrangement | T2 on track | 14 | 1960 | 1770 | 0.90 | — |
| | T2T3 on track | 28 | 5480 | 3560 | 0.65 | — |
| Improved arrangement | T2 off track | 14 | 3750 | 1780 | 0.47 | 47% |
| | T2T3 off track | 32 | 11350 | 4060 | 0.36 | 45% |

An amount of drilled rock according to a movement distance of the rock specimen (i.e., a distance between percussion spots) is measured while adjusting the movement distance of the rock specimen s and may be used for a proper button arrangement. Optimum impact energy may be calculated by measuring the amount of drilled rock with varying impact energy (i.e., impact velocity).

As such, when the testing apparatus and testing method according to the present disclosure is used, drilling efficiency of a new button arrangement can be determined experimentally, and thus, can be reflected in the button design of the drill bit.

On the other hand, while the above disclosure has described the case in which only one button is installed in the percussion piston, the case in which a plurality of buttons are installed in the percussion piston may be also embodied, which will be obvious to those skilled in the art referring to the specification. Therefore, it should be understood that the scope of protection of the present disclosure covers the case in which a plurality of buttons are installed in the percussion piston.

INDUSTRIAL APPLICABILITY

The present disclosure has the following effects.

First, the properness of a button arrangement can be determined by calculating an amount of drilled rock.

Second, not only for buttons re-arranged by the computer program, but also in the manufacture of a new drill bit, optimum button arrangement and impact energy (or impact velocity) can be obtained by calculating an amount of drilled rock with varying distances between percussion spots and with varying impact energy (or impact velocity).

Third, structure is simple, cost is low, and testing can be completed in a short time.

The invention claimed is:

1. A method for testing drilling efficiency of a drill bit, comprising the steps of:
   (a) preparing an apparatus for testing drilling efficiency, the apparatus comprising a drop piston which is installed to free-fall within a guide pipe, and a percussion piston having a button at a lower end;
   (b) allowing the button to hit a rock specimen by allowing the drop piston to fall to hit the percussion piston;
   (c) moving the rock specimen to a predetermined distance after the step (b), and hitting the rock specimen; and
   (d) calculating specific energy by measuring a volume of rock fractured by the hitting, wherein the volume is measured by a laser scanner.

2. The method for testing drilling efficiency of a drill bit according to claim 1, comprising, before the step (b), changing circular percussion spots made by buttons of the drill bit into linear percussion spots, wherein the movement in the step (c) is a linear movement, and the step (b) and the step (c) comprise hitting the rock specimen to correspond to the linear percussion spots.

3. The method for testing drilling efficiency of a drill bit according to claim 2, wherein an optimum impact velocity or impact energy and predetermined distance is calculated by calculating the specific energy with varying the impact velocity or impact energy of the percussion member, and the predetermined distance.

* * * * *